United States Patent [19]
Hough et al.

[11] 4,047,512
[45] Sept. 13, 1977

[54] ELECTRIC FUEL VAPORIZER

[75] Inventors: Jerome F. Hough, Allen Park; Douglas R. Hamburg, Birmingham, both of Mich.

[73] Assignee: Ford Motor Company, Dearborn, Mich.

[21] Appl. No.: 699,003

[22] Filed: June 21, 1976

[51] Int. Cl.$^2$ ............................................. F02M 31/00
[52] U.S. Cl. ................................ 123/122 E; 123/133; 123/122 F; 261/142
[58] Field of Search ............... 123/122 F, 122 E, 133; 219/206, 207, 300; 261/142; 431/208

[56] References Cited
U.S. PATENT DOCUMENTS

| | | | |
|---|---|---|---|
| 383,536 | 5/1988 | Newman | 219/300 |
| 904,203 | 11/1908 | Hertzberg | 123/133 |
| 990,249 | 4/1911 | Garcia | 219/207 |
| 1,415,184 | 5/1922 | McIlrath | 219/207 |
| 2,104,940 | 1/1938 | Woolery | 431/208 |
| 3,892,215 | 7/1975 | Hickling | 123/122 F |

Primary Examiner—Ronald H. Lazarus
Attorney, Agent, or Firm—Robert A. Benziger; Keith L. Zerschling

[57] ABSTRACT

An electrically powered liquid fuel vaporizer including overtemperature protection is described. A plurality of thin walled fuel conduits or tubes are arranged in a bundle and are communicated at one end to a source of liquid fuel and at their opposite end to a vaporized liquid fuel reservoir. Each end of the fuel tube bundle is provided with one member of a pair of electrical terminals. One of the pair of electrical terminals is communicated to a solenoid operated switch which in turn is communicated to one terminal of electric power source. The other of the pair of terminals is communicated to the opposite terminal of the electric power source. An insulating sheath or housing means is arranged around the fuel tube bundle. One end of the housing means is fixedly attached to the fuel tube bundle in proximity to one of the pair of electrical terminals. The housing member is provided with a third electrical terminal which communicates with the solenoid. The third electrical terminal as at the other end of the housing means. An overtemperature protection switch comprising a pair of contact discs, one of which is resiliently biased into contactive engagement with the other, is situated between the third electrical terminal and the adjacent one of the pair of fuel tube bundle terminals. Thermal expansion of the fuel tube bundle caused by the application of electrical energy between the pair of fuel tube bundle terminals will cause one of the pair of fuel tube bundle terminals to translate with respect to the housing terminal. After a predetermined amount of thermal expansion, the contact discs will separate terminating the application of electrical energy to the fuel tube bundle.

9 Claims, 2 Drawing Figures

ELECTRIC FUEL VAPORIZER

CROSS REFERENCE TO RELATED APPLICATION

This application is related to copending commonly assigned patent application Ser. No. 660,281, filed on Feb. 23, 1976 in the names of J. E. Auiler et al. and titled "Vaporized Liquid Fuel Delivery and Metering System".

BACKGROUND OF THE INVENTION

1. Field of the Invention

The present invention is directed to the field of internal combustion engine fuel delivery and metering systems generally. In particular, the present invention is directed to that portion of the above-noted field which is concerned with the delivery and metering of a liquid fuel into an air stream to provide a combustible air/fuel mixture for an internal combustion engine. More particularly still, the present invention is directed to that portion of the above-noted field which is concerned with the delivery and metering into an air stream of a fuel which is a liquid at standard temperature and pressure (STP) but which has been vaporized prior to mixture with the air stream. More particularly still, the present invention is directed to that portion of the above-noted field which is concerned with the vaporization of a vaporized liquid fuel for mixture with a stream of air in order to establish a combustible air/fuel mixture. More particularly still, the present invention is directed to that portion of the above-noted field which is concerned with the vaporization of a liquid fuel for an internal combustion engine under conditions in which the engine itself is not capable of generating substantial quantities of heat. More particularly still, the present invention is directed to that portion of the above-noted field which is concerned with the provision of an electrically operated liquid fuel vaporizer for providing quantities of vaporized liquid fuel sufficient to initiate and sustain engine operation during that time period when engine operation does not generate sufficient quantities of heat, as a combustion by-product, to be useful in vaporizing a liquid fuel.

2. Description of the Prior Art

It is well known in the prior art to provide a fuel in liquid form to a moving air stream for delivery to the combustion chambers of an internal combustion engine. The prior art systems generally have utilized mechanical or electromechanical fuel delivery and metering apparatus to provide metered quantities of liquid fuel in proximity to, and in some cases into, the combustion chambers of an internal combustion engine. The prior art has also taught that a quantity of liquid fuel may be added to a quantity of moving air upstream from, and for ultimate delivery to, a plurality of combustion chambers through a plurality of intake manifold conduits. The advent of federally mandated internal combustion engine exhaust emission standards has resulted in the investigation of techniques to substantially reduce the quantity of pollutants produced by an internal combustion engine. One technique proposed to reduce the quantity of atmospheric pollutants generated by an internal combustion engine has been to prevaporize the liquid fuel prior to delivery to the air stream. The basis of this proposal is the improved ability to control, from cylinder-to-cylinder within any one internal combustion engine, the air/fuel ratio of the combustion mixture. To the extent that the air/fuel ratio may be more accurately controlled, the ability to implement techniques for the reduction of atmospheric pollutants generated by the internal combustion engine may be increased.

The prior art contains a substantial number of suggestions directed to the vaporization of a liquid fuel for use in a fuel delivery system for an internal combustion engine. However, the prior art has failed to address the consideration of the vaporization of a liquid fuel for start-up of the internal combustion engine and has also failed to address the consideration of vaporization of a liquid fuel in quantities sufficient to sustain engine operation during the early phases of engine operation when the heat generated by the engine is insufficient to promote vaporization of a liquid fuel. It is therefore a specific object of the present invention to provide an auxiliary heater apparatus for converting a liquid fuel to a vapor in quantities sufficient to initiate and sustain engine operation during those phases of engine operation when the heat generated by the engine is insufficient to vaporize the liquid fuel. More particularly still, it is an object of the present invention to provide such a device which may reliably generate substantial quantities of liquid fuel vapor within a short time period after initiation of heating. More particularly still, it is an object of the present invention to provide such a device which will not create a hazard to the engine or to any automotive vehicle with which the engine is associated. More particularly still, it is an object of the present invention to provide such a device which includes overtemperature protection as a safeguard to prevent the device from generating quantities of heat in excess of that actually required to generate the desired quantities of vaporized liquid fuel. It is a further and specific object of the present invention to provide such a device which may be powered by the vehicle electrical system and which may be rendered operative only during those time periods when the auxiliary heater device is required as a liquid fuel vapor generator.

SUMMARY OF THE PRESENT INVENTION

The present invention provides an electrically operated liquid fuel vaporizer comprised of a plurality of thin walled electrically conductive fuel tubes or conduits. The auxiliary heater tubes are welded or otherwise fabricated into a unitary thermally cooperative unit having a relatively high surface-to-volume ratio consonant with rapid heating of the fuel within the fuel tubes. The opposite ends of the fuel tube bundle are provided with means forming a pair of electrical terminals. A thermally insulating housing means is provided in surrounding relationship to the fuel tube bundle. One end of the housing means is fixedly attached to the fuel tube bundle in proximity to a first member of the pair of electrical terminals. The opposite end of the housing means is provided with a third electrical terminal. One of the pair of fuel tube bundle terminals is communicated to one terminal of a voltage supply. The other of the pair of fuel tube bundle terminals is communicated to one terminal of a solenoid operated control switch member. The other terminal of the solenoid operated control switch member is connected to the power supply. The control switch is communicated to the housing member terminal.

Means defining an overtemperature protection switch are arranged to intercommunicate the housing member terminal with one of the pair of fuel tube bundle terminals. These means comprise a pair of contact discs, one of which is fixedly connected to one of its associated terminal members and the other of which is resiliently coupled to the other of its associated terminal members with means permitting limited relative movement of the resiliently biased contact disc member. On the application of heating energy, the length of the fuel tube bundle will increase due to thermal expansion. After a predetermined amount of length increase has occurred, the resiliently biased spring disc member will reach its limit of travel and the spring disc members will separate terminating the electric circuit which includes the solenoid member. This will terminate the flow of electrical energy through the fuel tube bundle to limit heating.

DETAILED DESCRIPTION OF THE PREFERRED EMBODIMENT

Figure 1:
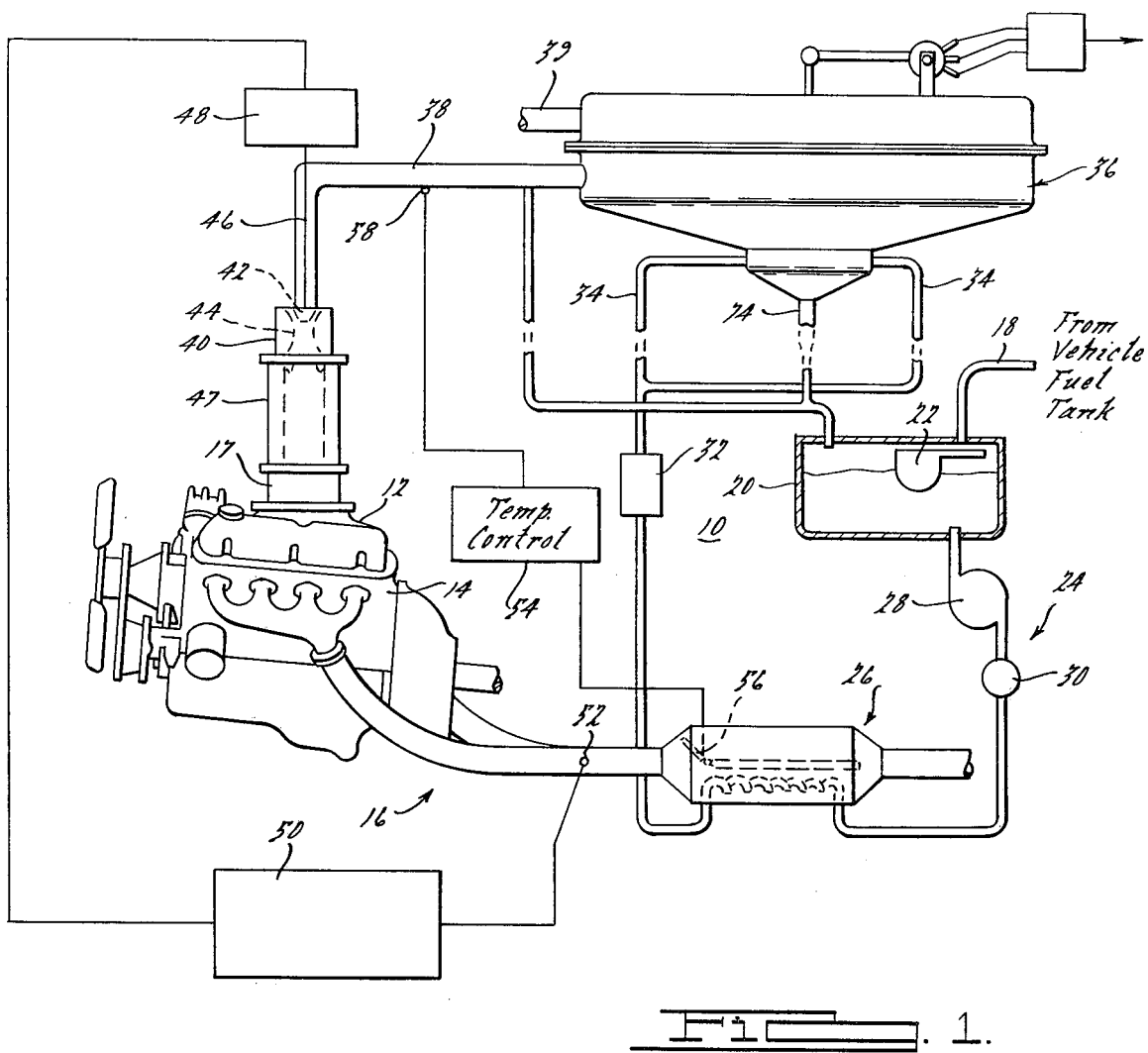
FIG. 1 is a schematic view which illustrates a vaporized liquid fuel delivery and metering system with which the present invention is of utility.

Referring now to the drawing wherein like numerals designate like structure throughout the various views thereof, FIG. 1 illustrates a vaporized liquid fuel delivery and metering system 10 which includes the electrically operated liquid fuel vaporizer according to the present invention. The vaporized liquid fuel delivery and metering system 10 is arranged to provide a combustible air/fuel mixture to the intake manifold 12 of an internal combustion engine 14. Internal combustion engine 14 is provided with combustion by-product exhaust gas conduit means 16. Intake manifold 12 is provided with throttle body 17. As illustrated, internal combustion engine 14, intake manifold 12, throttle body 17 and exhaust gas conduit means 16 are substantially conventional. For purposes of illustration, it will be considered that internal combustion engine 14 is of the type adapted for installation and use in powering an automotive vehicle, not shown.

System 10 is arranged to receive liquid fuel from a conventional liquid fuel reservoir or tank, not shown, through conduit 18. Conduit 18 communicates with intermediate liquid fuel reservoir 20. The communication between conduit 18 and intermediate reservoir 20 may be controlled, for example, by a pivoted float valve 22 in the conventional manner. As will be appreciated, liquid fuel could be pumped through conduit 18 by conventional pumping means such as the conventional mechanical or electrical fuel pump normally used in automotive vehicles.

Liquid fuel contained in intermediate reservoir 20 may be provided by coarse liquid fuel delivery means 24 to primary heating means 26. Coarse liquid fuel delivery 24 may include for example, an electrical or mechanical liquid pump 28 and/or a liquid flow control valve 30. An auxiliary heating means 32 according to the present invention is arranged to receive fluid flow from coarse liquid fuel delivery means 24. As illustrated, the auxiliary heating means 32 are in serial fluid flow relation with the primary heating means 26 so that fuel provided from intermediate reservoir 20 would flow serially through the primary heating means 26 and thence through auxiliary heating means 32. The heating means are shown to be communicated via conduits 34 to a vapor reservoir 36. Auxiliary heating means 32 is described in greater detail hereinbelow with reference to FIG. 2.

As illustrated in FIG. 1, the primary and auxiliary heating means 26, 32 are connected in serial fluid flow relationship. In order for efficient operation of the auxiliary heating means 32, if should be designed for relatively low fuel flow consonant with operation of the associated engine at idle. As such, however, the auxiliary heating means 32 could present a high impedance to fluid flow and could impede engine operation under high fuel consumption conditions. It is therefore contemplated that the primary and auxiliary heating means could be connected in parallel fluid flow relationship. It is also contemplated to provide a fluid by-pass valve downstream from primary heating means 26 and upstream from the auxiliary heating means 32 to place the primary heating means 26 in direct fluid communication with the vapor reservoir 36 when the auxiliary heating means 32 are not required as a vapor supply source.

Vapor reservoir 36 is communicated by way of conduit 38 with carburetor means 40. As used herein "carburetor" means any device for mixing fuel with air to establish a combustible air/fuel mixture. As illustrated in FIG. 1, the vapor delivery nozzle 42 of vapor delivery conduit 38 is positioned within the low pressure zone formed by the metering venturi means 44 of the carburetor means 40. A movable pintle 46 is situated within the vapor delivery nozzle 42 and is controlled by servomechanism means 48. Carburetor means 40 include mixing section 47 which intercommunicates the metering venturi means 44 with the throttle body 17 and the intake manifold 12.

Servomechanism 48 may be for example a conventional servomotor operated electrically or by electromechanical means. Servomechanism 48 receives an input command signal from servomechanism control means 50. As here illustrated, servomechanism control means 50 are arranged to be responsive to an exhaust gas sensor 52 which may be for example, a titania exhaust gas sensor according to U.S. Pat. No. 3,886,785. According to FIG. 1, fuel delivery and metering system 10 is also provided with temperature control means 54. Temperature control means 54 are arranged to be responsive to the vapor temperature in vapor delivery conduit 38 in order to control an exhaust gas flow diverter valve 56 within primary heating means 26.

Figure 2:
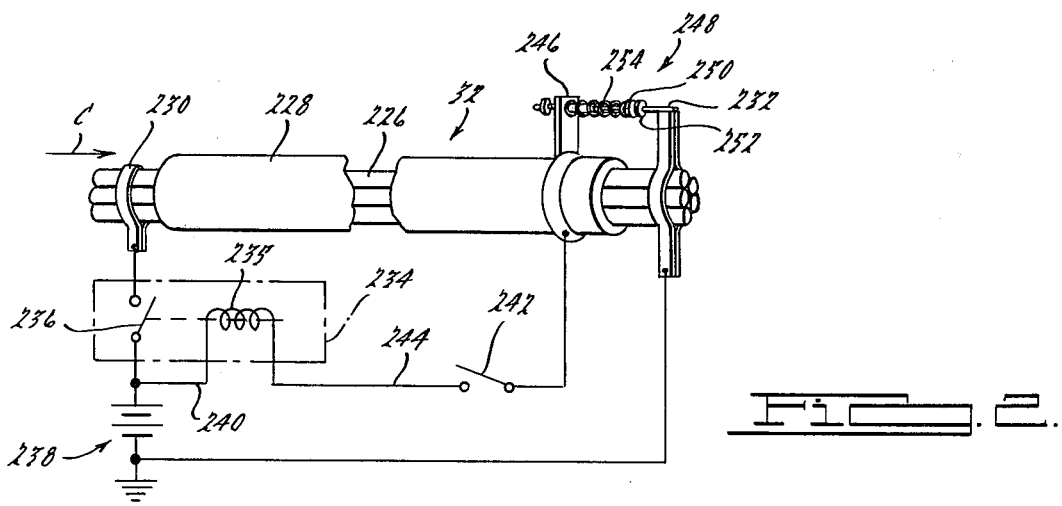
FIG. 2 illustrates, in a diagrammatic view, the auxiliary electrical liquid fuel vaporizing means according to the present invention.

Referring now to FIG. 2, the presently preferred auxiliary heating means 32 according to the present invention is illustrated in a partly diagrammatic, partly schematic view. In order to provide a large surface-to-volume ratio consonant with rapid vaporization, auxiliary heating means 32 comprise a plurality of electrically conductive heater tubes 226 each of which is arranged to receive a flow of liquid fuel in the direction of arrow C. Conductive tubes 226 are fabricated preferably from thin walled stainless steel tubing. For example, a fuel tube bundle comprised of five thin walled stainless steel tubing sections approximately 15 inches in length and having a 0.07 inch outer diameter has been found to be satisfactory. Tube members 226 are encased within a sheath or housing means 228. Housing means 228 may be, for example, ceramic material having a relatively low coefficient of thermal expansion and good thermal insulating capability. In order to assure uniform heating, tubes 226 may be welded or otherwise bonded together to form a unitary structure.

A first terminal member 230 is connected to one end, for example the upstream end, of the fuel tube bundle of tubes 226. A second terminal member 232 is connected to the opposite, or downstream, end of the tubing sections 226. Electrical terminal 230 is communicated to solenoid switch means 234 which includes switch member 236. Switch member 236 is electrically connected to terminal 230. Second electrical terminal 232 is communicated to one terminal of a source of electrical energy such as, for example, battery 238. Solenoid switch member 236 is a normally open electrical switch arranged to be closed upon energization of the solenoid member 235. Solenoid switch means 234 is communicated to the other terminal of battery 238 by conductor 240 and is also communicated to switch 242 by a second conductor 244.

A third electrical terminal member 246 is attached to the housing means 228 and is electrically communicated to switch 242. An overtemperature switch means 248 is connected electrically between terminal 232 and housing terminal 246. Overtemperature switch means 248 includes a pair of contact discs or members 250, 252 which, under normal temperature conditions, will be in abutting electrical contactive engagement. Contact disc 250 is axially displaceably mounted to housing terminal member 246 by resilient means in the form of spring member 254.

In operation, closure switch 242 will establish and electrical circuit from battery 238 through solenoid member 235, housing terminal member 246, overtemperature switch means 248, terminal member 232, back to the battery 238. Establishment of this completed circuit will actuate solenoid switch means 234 to close switch member 236 thereby causing an electrical voltage to appear between terminal members 230 and 232. This voltage will cause an electrical current to flow through the fuel flow tubes 226 which current will be operative to elevate the temperature of the tubes 226. Switch 242 may be, for example, the ignition switch of an internal combustion engine electrical system. Alternatively, switch 242 may be a separately actuated switch which would be actuated slightly in advance of engine start-up. Using five thin walled stainless steel tubes, as hereinabove described, for the fuel flow tubes 226 and using the conventional twelve volt battery normally provided with automotive vehicles, we have found that the auxiliary heater 32 would convert approximately 2000 watts of electrical energy to heating energy. Commercially available gasoline is comprised of a plurality of hydro-carbon fuel fractions each of which vaporizes at a different, which can be expected to be fully vaporized at temperatures above about 425° F. At a 70° F ambient temperature, this magnitude of heating energy would be operative to sufficiently charge the vapor reservoir 36 to provide start-up vaporized liquid fuel within about 10 seconds. It will be appreciated that auxiliary heater means 32 may be arranged for serial or parallel fluid flow with the primary heater means 26. By suitable valving, auxiliary heater means 32 could be switched from parallel flow to serial flow and could also be placed in a combined parallel serial flow relation with primary heater means 26.

Overtemperature switch means 248 is operative to limit the maximum temperature to which fuel flow tubes 226 may be elevated. By fixedly attaching one end, in the illustrated embodiment the upstream end, of the fuel tubes 226 to a nonheated structural member or vehicle body part and by fixedly attaching housing means 228 to the fuel flow tubes in close association with one terminal of the pair of fuel tube bundle terminals, for example, terminal 230, the opposite or downstream end of fuel tubes 226 may be allowed to move axially with respect to the mounting and with respect to the housing means 228. The application of heat energy will cause fuel flow tubes 226 to undergo an axial expansion which will cause rightward movement, relative to FIG. 2, of contact disc 252 with respect to contact disc 250. When rightward movement has reached a predetermined value, which may be selected to be representative of a temperature sufficiently high to completely vaporize the liquid fuel passing through tubes 226, spring member 254 will reach its limit of rightward travel and the contact members 250, 252 will separate. This separation of the contact discs 250, 252 will terminate the circuit which includes solenoid member 235. This will cause switch member 236 to open thereby discontinuing the flow of electric energy through the fuel flow tubes 226.

It is contemplated that the auxiliary electric vaporizer according to FIG. 2, switch 242 may include a time delay mechanism so that switch 242 may be in a closed or current flow condition for a predetermined period of time. This time period could be, for example, pre-calculated to be sufficiently long to assure that engine start-up and operation has provided a supply of heated exhaust gas to the primary heater means 26, according to FIG. 1, to assure continuous supply of vaporized liquid fuel to the vapor reservoir 36. Alternatively, switch 242 could be re-opened in response to a temperature sensor indication of sufficient heat availability in the primary heater means 26 to supply vaporized liquid fuel to the vapor reservoir 36 and the engine 14. It is also contemplated that fuel flow tubes 226 could be arranged in a helical pattern to conserve space and reduce heating time. It would also be possible to provide a logic circuit, responsive to a variety of inputs, for controlling switch 242.

We claim:

1. An electrically powered liquid fuel vaporizer system for vaporizing liquid fuel prior to its mixing with air comprising in combination:

a liquid fuel source, a plurality of electrically conductive fuel conduits arranged in side-by-side relation, each conduit having a liquid fuel receiving end and a vaporized liquid fuel outlet end, said liquid fuel receiving end communicating with said source of liquid fuel and arranged to receive a stream of said liquid fuel while excluding the atmosphere, said vaporized liquid fuel outlet end arranged for communication with a vapor storage means, while avoiding intermixing with the atmosphere, said conduits being mutually interconnected to form a thermally unitary body;

means defining a first electrical terminal in electrical contact with a first of the pair of ends of said plurality of fuel conduits;

electrical circuit means for establishing a flow of electrical current through said plurality of fuel conduits between said first and second terminal means whereby the temperature of the plurality of fuel conduits may be elevated to cause substantially complete thermal vaporization of a liquid fuel flowing therethrough.

2. The vaporizer according to claim 1 wherein said plurality of fuel conduits and electrical circuit means are sized in relation to the expected maximum rate of delivery of liquid fuel to the fuel conduits to assure substantially complete vaporization of the liquid fuel which may flow therethrough.

3. The vaporizer according to claim 1 wherein said plurality of fuel conduits are fabricated from thin walled metal tubing, the metal being selected from the group of metals having resistivities substantially in excess of the resistivity values associated with good electrical conductivity.

4. The vaporizer according to claim 3 wherein the metal of the fuel conduits has a resistivity in excess of about 40 microhm-cm.

5. The vaporizer according to claim 4 wherein the metal of the fuel conduits has a resistivity of less than about 100 microhm-cm.

6. An electrically powered liquid fuel vaporizer comprising in combination:

a liquid fuel source thermal insulating means;

a plurality of electrically conductive fuel conduits arranged in side-by-side relation, each conduit having a pair of ends and intercommunicating with said source of liquid fuel with a vapor storage means while avoiding contact between the fuel and the atmosphere, said conduits being mutually interconnected to form a thermally unitary body;

means defining a first electrical terminal in electrical contact with a first of the pair of ends of said plurality of fuel conduits;

means defining a second electrical terminal in electrical contact with the other end of said plurality of fuel conduits;

electrical circuit means for establishing a flow of electrical current through said plurality of fuel conduits between said first and second terminal means whereby the temperature of the plurality of fuel conduits may be elevated for substantially complete vaporization of the liquid fuel flowing therethrough;

means defining a third electrical terminal attached to the nonfixedly attached end of said housing means in generally confronting relation to said means defining a second electrical terminal; and electrical contact means electrically interruptable interconnecting said means defining a third electrical terminal and said means defining a second electrical terminal means.

7. The vaporizer according to claim 6 wherein said electrical circuit means are communicated electrically to said first and third circuit means whereby thermal expansion of said plurality of fuel conduits substantially in excess of the thermal expansion of said insulating housing means may terminate the electrical contact between said means defining a second electrical terminal and said means defining a third electrical terminal to thereby limit the maximum temperature of said plurality of fuel conduits.

8. The vaporizer according to claim 6 wherein said electrical contact means comprise:

first contact means fixedly attached to one of said second and third terminal means and second contact means movably attached to the other of said second and third terminal means;

resilient means for biasing said second contact means toward said first contact means; and stop means for establishing the maximum approach of said second contact means toward said first contact means.

9. The vaporizer according to claim 8 wherein said stop means are adjusted to allow electrical contact between said first and second contact means for fuel conduit tube temperatures below a selected maximum temperature.

* * * * *